US012680518B2

(12) United States Patent
Tidwell et al.

(10) Patent No.: US 12,680,518 B2
(45) Date of Patent: Jul. 14, 2026

(54) METHODS AND SYSTEMS FOR DETECTING HIGH FRICTION WITHIN FLOW CONTROL DEVICES

(71) Applicant: Cummins Inc., Columbus, IN (US)

(72) Inventors: Michael R. Tidwell, Bloomington, IN (US); Sarah E. Gnau, Lexington, KY (US); Eric Gonzalez, Indianapolis, IN (US); Abhishek Javvaji, Fitchburg, WI (US)

(73) Assignee: Cummins Inc., Columbus, IN (US)

( * ) Notice: Subject to any disclaimer, the term of this patent is extended or adjusted under 35 U.S.C. 154(b) by 72 days.

(21) Appl. No.: 18/480,570

(22) Filed: Oct. 4, 2023

(65) Prior Publication Data

US 2024/0093656 A1 Mar. 21, 2024

Related U.S. Application Data

(63) Continuation of application No. PCT/US2022/025316, filed on Apr. 19, 2022.

(60) Provisional application No. 63/177,135, filed on Apr. 20, 2021.

(51) Int. Cl.
*F02D 41/22* (2006.01)

(52) U.S. Cl.
CPC ...... *F02D 41/222* (2013.01); *F02D 2041/224* (2013.01)

(58) Field of Classification Search
CPC ............. F02D 2041/224; F02D 41/222; G01F 15/005; G01F 25/0092; G05B 23/0256
See application file for complete search history.

(56) References Cited

U.S. PATENT DOCUMENTS 6,840,222 B2 1/2005 Schilling et al.
6,901,791 B1 6/2005 Frenz et al.
7,930,116 B2 4/2011 Huebner
8,700,360 B2 4/2014 Garimella et al.
9,021,791 B2 5/2015 Barcin et al.
(Continued)

FOREIGN PATENT DOCUMENTS

EP 0845722 * 6/1998
EP 1226355 8/2005

OTHER PUBLICATIONS

International Search Report and Written Opinion, PCTUS2225316, Aug. 19, 2022, 6 pgs.

*Primary Examiner* — Phutthiwat Wongwian
(74) *Attorney, Agent, or Firm* — Taft, Stettinius & Hollister LLP

(57) ABSTRACT

Method and system for detecting a high friction within a flow control device of a fuel system are disclosed. For example, the method includes receiving a service test sequence to execute a service test, performing, in response to receiving the service test sequence, the service test to generate test data, the service test including a first test cycle with a first dither level and a second test cycle with a second dither level, wherein the second dither level is different from the first dither level. The method further includes determining whether a performance difference between the first test cycle and the second test cycle exceeds a predetermined threshold based on the test data and detecting, in response to determining that the performance difference exceeds the predetermined threshold, a presence of high friction within the flow control device.

20 Claims, 6 Drawing Sheets

(56) References Cited

U.S. PATENT DOCUMENTS

| | | | |
|---|---|---|---|
| 10,775,223 | B2 | 9/2020 | Mueller et al. |
| 2001/0029777 | A1 | 10/2001 | Bonne et al. |
| 2004/0120804 | A1 | 6/2004 | Sabini et al. |
| 2019/0107070 | A1 | 4/2019 | Ikuta et al. |
| 2020/0221637 | A1 | 7/2020 | Dunn et al. |

* cited by examiner

METHODS AND SYSTEMS FOR DETECTING HIGH FRICTION WITHIN FLOW CONTROL DEVICES

The present application is a continuation of International Application No. PCT/US2022/025316 filed Apr. 19, 2022 which claims the benefit of and priority to U.S. Application No. 63/177,135 filed Apr. 20, 2021, both of which are hereby incorporated by reference.

FIELD

Disclosed embodiments relate generally to methods and systems for detecting high friction within flow control devices in fuel systems, and more particularly to methods and systems for detecting high friction within a flow control device via a service test.

BACKGROUND

Often times, vehicle owners complain about a change in the performance of their vehicles. For example, common complaints include hesitation, low power, frequent regen, and/or rough idle. Generally, when such vehicles are brought into a repair shop, the repair shop runs various tests to diagnose a problem and potentially repair the vehicles. However, for many performance-based complaints, it is difficult to identify components that are causing the problem. Specifically, isolating a root cause for performance complaints resulting from high friction or mechanical stickiness within a flow control device (e.g., inlet metering valves (IMVs), volume control valves, or flow control valves) of a fuel system is difficult but isolating the problem to the flow control device correctly will prevent a replacement of more expensive parts, such as fuel pumps and injectors. As such, it is desirable to develop more accurate and efficient technique for detecting high friction flow control devices in fuel systems.

SUMMARY

According to one embodiment, the present disclosure provides a diagnostic monitoring system for detecting a high friction within a flow control device of a fuel system. The diagnostic monitoring system includes a computing device and an engine controller communicatively coupled to the computing device and the flow control device. The computing device is configured to execute software to cause the engine controller to receive a service test sequence to execute a service test, perform, in response to a receipt of the service test sequence, the service test to generate test data, the service test including a first test cycle with a first dither level and a second test cycle with a second dither level, determine whether a performance difference between the first test cycle and the second test cycle exceeds a predetermined threshold based on the test data, and detect, in response to a determination that the performance difference exceeds the predetermined threshold, a presence of high friction within the flow control device, wherein the second dither level is different from the first dither level.

In some embodiments, the engine controller may be further configured to execute software to cause the engine controller to determine, in response to a receipt the service test sequence, whether one or more enable conditions are satisfied to execute the service test, and transmit, in response to a determination that the one or more enable conditions are not satisfied, a notification indicating that the service test cannot be executed. The notification may further include one or more remedial actions that can be performed to satisfy the one or more enable conditions.

In some embodiments, to perform the service test may include to control the flow control device using a high frequency pulse-width modulation (PWM) signal with a superimposed low frequency dither waveform.

In some embodiments, to perform the service test may include to: perform the first test cycle by applying a first amplitude of dither in a flow control device signal, and perform the second test cycle by apply a second amplitude of dither in the flow control device signal, wherein the second amplitude is different from the first amplitude.

In some embodiments, the test data may include a first rail pressure command and a first rail pressure feedback collected during the first test cycle, and a second rail pressure command and a second rail pressure feedback collected during the second test cycle.

In some embodiments, to determine whether the performance difference between the first test cycle and the second test cycle exceeds the predetermined threshold includes to: determine a first sum of absolute pressure error between the first rail pressure command and the first rail pressure feedback, determine a second sum of absolute pressure error between the second rail pressure command and the second rail pressure feedback, determine a difference between the first sum and the second sum, determine whether the difference exceeds the predetermined threshold, and detect, in response to a determination that the difference exceeds the predetermined threshold, the presence of high friction within the flow control device.

In some embodiments, the engine controller may be configured to execute software to further cause the computing device to transmit, in response to a detection of the presence of high friction within the flow control device, a notification to a technician to replace the flow control device.

According to another embodiment, the present disclosure provides a method for detecting a high friction within a flow control device of a fuel system. The method includes receiving a service test sequence to execute a service test, performing, in response to receiving the service test sequence, the service test to generate test data, the service test including a first test cycle with a first dither level and a second test cycle with a second dither level, determining whether a performance difference between the first test cycle and the second test cycle exceeds a predetermined threshold based on the test data, and detecting, in response to determining that the performance difference exceeds the predetermined threshold, a presence of high friction within the flow control device. The second dither level is different from the first dither level.

In some embodiments, the method may further include determining, in response to receiving the service test sequence, whether one or more enable conditions are satisfied to execute the service test, and transmitting, in response to determining that the one or more enable conditions are not satisfied, a notification indicating that the service test cannot be executed. The notification may further include one or more remedial actions that can be performed to satisfy the one or more enable conditions.

In some embodiments, performing the service test may include controlling the flow control device using a high frequency pulse-width modulation (PWM) signal with a superimposed low frequency dither waveform.

In some embodiments, performing the service test may include performing the first test cycle by applying a first amplitude of dither in a flow control device signal, and performing the second test cycle by apply a second amplitude of dither in the flow control device signal, the second amplitude is different from the first amplitude.

In some embodiments, the test data may include a first rail pressure command and a first rail pressure feedback collected during the first test cycle, and a second rail pressure command and a second rail pressure feedback collected during the second test cycle.

In some embodiments, determining whether the performance difference between the first test cycle and the second test cycle exceeds the predetermined threshold may include determining a first sum of absolute pressure error between the first rail pressure command and the first rail pressure feedback, determining a second sum of absolute pressure error between the second rail pressure command and the second rail pressure feedback, determining a difference between the first sum and the second sum, determining whether the difference exceeds the predetermined threshold, and detecting, in response to determining that the difference exceeds the predetermined threshold, the high friction within the flow control device.

In some embodiments, the method may further include transmitting, in response to detecting the presence of high friction within the flow control device, a notification to a technician to replace the flow control device.

According to another embodiment, the present disclosure provides a non-transitory computer-readable medium that stores instructions for detecting a high friction within a flow control device of a fuel system. The instructions when executed by one or more processors of a computing device, cause the computing device to: receive a service test sequence to execute a service test, perform, in response to a receipt of the service test sequence, the service test to generate test data, the service test including a first test cycle with a first dither level and a second test cycle with a second dither level, determine whether a performance difference between the first test cycle and the second test cycle exceeds a predetermined threshold based on the test data, and detect, in response to a determination that the performance difference exceeds the predetermined threshold, a presence of high friction within the flow control device. The second dither level is different from the first dither level.

In some embodiments, the instructions when executed by the one or more processors may further cause the computing device to: determine, in response to a receipt the service test sequence, whether one or more enable conditions are satisfied to execute the service test, and transmit, in response to a determination that the one or more enable conditions are not satisfied, a notification indicating that the service test cannot be executed. The notification may further include one or more remedial actions that can be performed to satisfy the one or more enable conditions.

In some embodiments, to perform the service test may include to control the flow control device using a high frequency pulse-width modulation (PWM) signal with a superimposed low frequency dither waveform.

In some embodiments, to perform the service test may include to: perform the first test cycle by applying a first amplitude of dither in a flow control device signal, and perform the second test cycle by apply a second amplitude of dither in the flow control device signal, the second amplitude is different from the first amplitude.

In some embodiments, the test data may include: a first rail pressure command and a first rail pressure feedback collected during the first test cycle, and a second rail pressure command and a second rail pressure feedback collected during the second test cycle.

In some embodiments, to determine whether the performance difference between the first test cycle and the second test cycle exceeds the predetermined threshold may include to: determine a first sum of absolute pressure error between the first rail pressure command and the first rail pressure feedback, determine a second sum of absolute pressure error between the second rail pressure command and the second rail pressure feedback, determine a difference between the first sum and the second sum, determining whether the difference exceeds the predetermined threshold, and detect, in response to a determination that the difference exceeds the predetermined threshold, the presence of high friction within the flow control device.

It should be appreciated that in various embodiments the foregoing concepts, and additional concepts discussed below, may be arranged in any suitable combination. Further, other advantages and novel features of the present disclosure will become apparent from the following detailed description of various non-limiting embodiments when considered in conjunction with the accompanying figures.

BRIEF DESCRIPTION OF THE DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
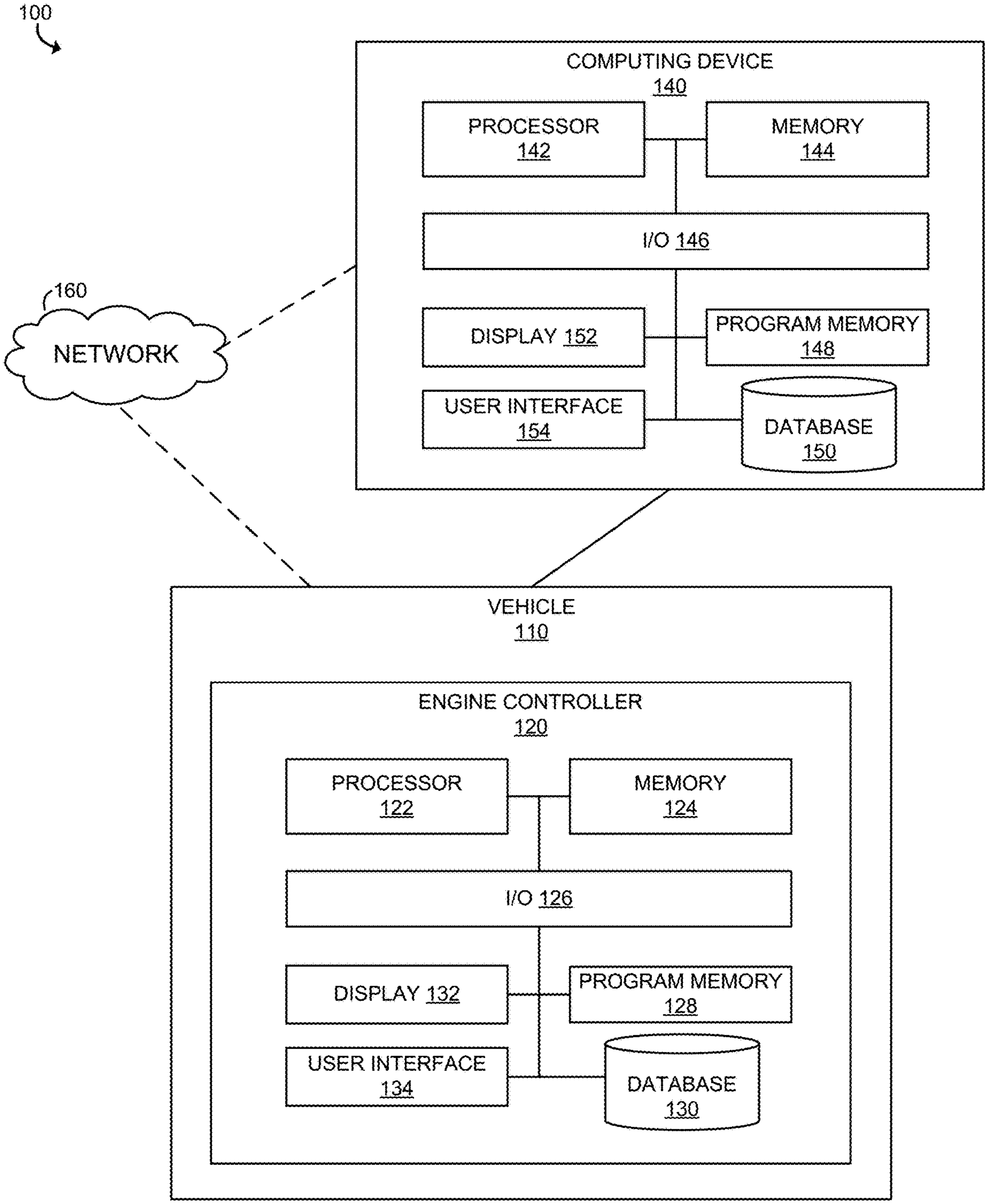
FIG. 1 is a block diagram illustrating an exemplary vehicle system according to an embodiment as disclosed herein.

FIG. 1 is a conceptual diagram of a diagnostics monitoring system 100 for detecting a high friction within a flow control device of a fuel system of a vehicle 110. Specifically, the flow control device may be embodied as any control device that is configured to control a flow of fuel into a fuel system proportionally to a current level driven by a pulse-width modulation (PWM), which is described further below. In the illustrative embodiment, the flow control device is embodied as an inlet metering valve (IMV) of a high pressure common rail (HPCR) fuel system of a spark ignition engine or a compression ignition engine of the vehicle 110.

In the illustrative embodiment, the diagnostics monitoring system 100 dynamically adjusts a dither level in an IMV signal during an IMV service test to detect a presence of high friction or mechanical stickiness within the IMV (also known as sticky IMV). In the illustrative embodiment, the vehicle 110 includes an engine controller 120 and is communicatively coupled to a computing device 140. In the illustrative embodiment, the engine controller 120 is communicatively coupled to the computing device 140 via a wire. However, it should be understood that, in some embodiments, the engine controller 120 may be communicatively coupled to the computing device wirelessly via a network 160. For example, an application running on the computing device 140 may communicate with the engine controller 120 to monitor and/or diagnose performance of the vehicle 110 in real-time. More specifically, the computing device 140 may transmit instructions to the engine controller 120 to run an inlet metering valve (IMV) service test to detect a sticky IMV.

Generally, one or more inlet metering valves (IMV) are installed on one or more high-pressure fuel pumps of a fuel system of the vehicle 100 to control a flow of fuel into a high-pressure fuel pump and a common rail. Control of a fuel pressure relies on the engine controller 120 adjusting the current to the IMV to increase or decrease a fuel pump flow depending upon a pressure command and an injected fuel demand. During operation, the IMV may rely on dither (e.g., noise, oscillation, or vibration) to oscillate or vibrate internal parts of the IMV to continuously replenish lubricating fuel films between moving parts within the IMV to prevent friction and allow the IMV to move quickly when needed. However, when the lubricating fuel film wears off (e.g., the fluid being squeezed out) at metal to metal contacts as the parts constantly stop and move, this causes high friction between the moving parts of the IMV and, thereby, reduces performance of the vehicle. For example, sticky IMVs are one of potential cause of a loss of fuel pressure control performance in fuel system (e.g., poor rail pressure control in high pressure common rail (HPCR) fuel systems).

Figure 3:
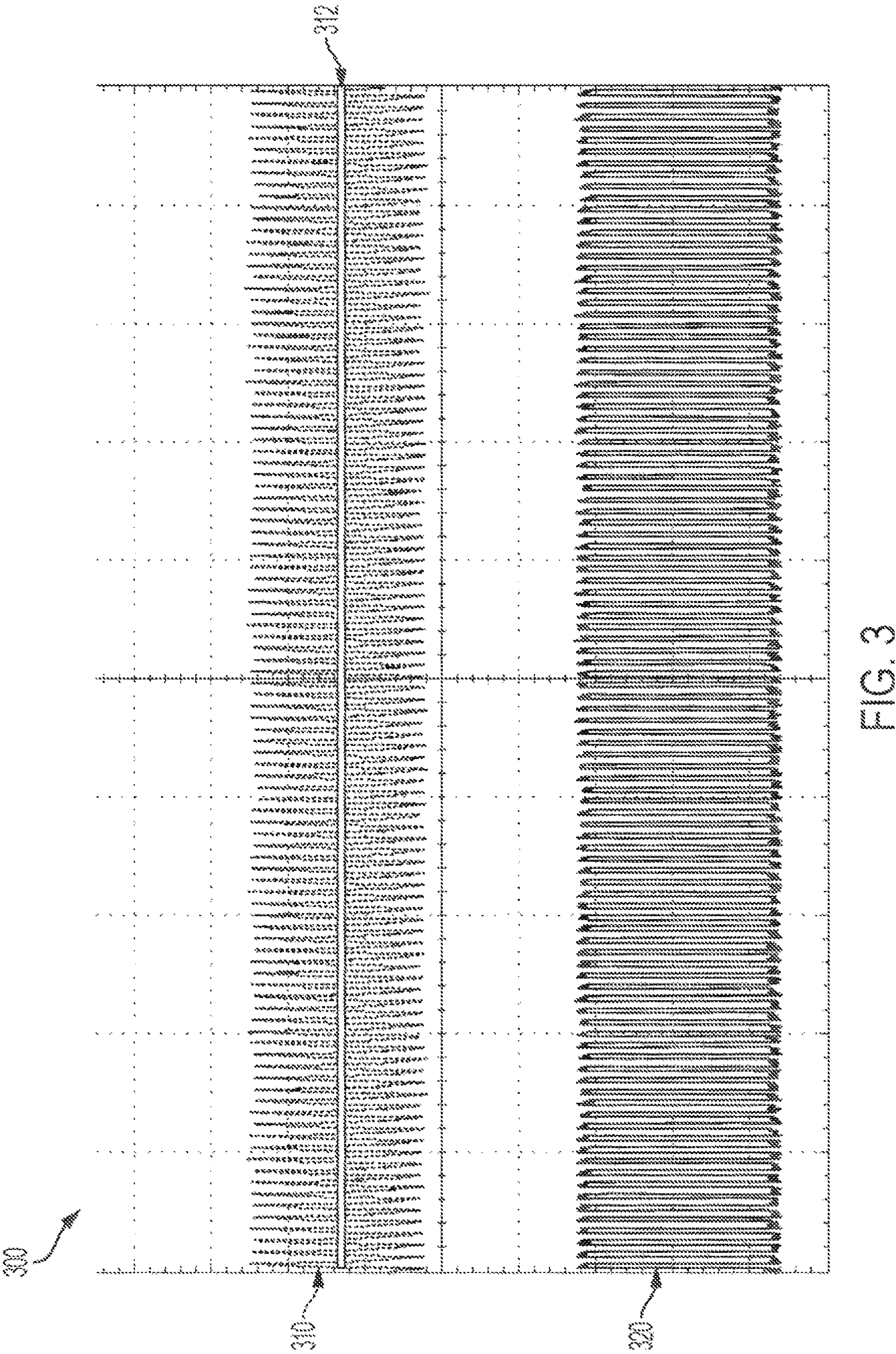
FIG. 3 is an exemplary graph illustrating an actual current flowing through the IMV and an actual voltage being applied across the IMV according to the present disclosure.

In the illustrative embodiment, the IMV controls flow of fuel into the fuel system proportionally to a current level through a solenoid (e.g., magnetic coil). Such current level through the solenoid is controlled with a pulse-width modulation (PWM) where voltage is switched across the solenoid terminals of the IMV. As described above, it should be appreciated that the present disclosure is applicable to any flow control device driven via PWM to detect a presence of high friction or mechanical stickiness within the flow control device. In a typical PWM strategy, voltage is switched on for a fraction, known as a percent duty cycle, of a repeating time interval, known as a PWM period. In voltage terms, the PWM frequency appears as a square wave. However, as a result of an inductive load of the IMV solenoid, a PWM driver produces electrical current with a sawtooth waveform, as shown in FIGS. 3 and 4.

For example, if a target current flowing through an IMV with a resistance of 3 ohms (Ω) is 2 amps (A), then an effective voltage of 6 volts (V) is required. The target current is commanded by the engine controller 120. It should be appreciated that the computing device 140 may transmit instructions to the engine controller 120 to set the target current. To achieve the target current, a fixed voltage of 12 V from a battery may be switched on and off at 50 percent to produce 6 V across the IMV. In response, the engine controller 120 monitors the actual current flowing through the IMV and the actual voltage being applied across the IMV. For example, a graph 300 illustrates a target current 312 (shown by a white line with a black outline), an actual current 310 (shown by a dotted line) flowing through the IMV and an actual voltage 320 (shown by a solid line) being applied across the IMV. The current 310 is shown in FIG. 3 as a sawtooth waveform. The voltage 320 is shown in FIG. 3 as a square waveform.

Figure 4:
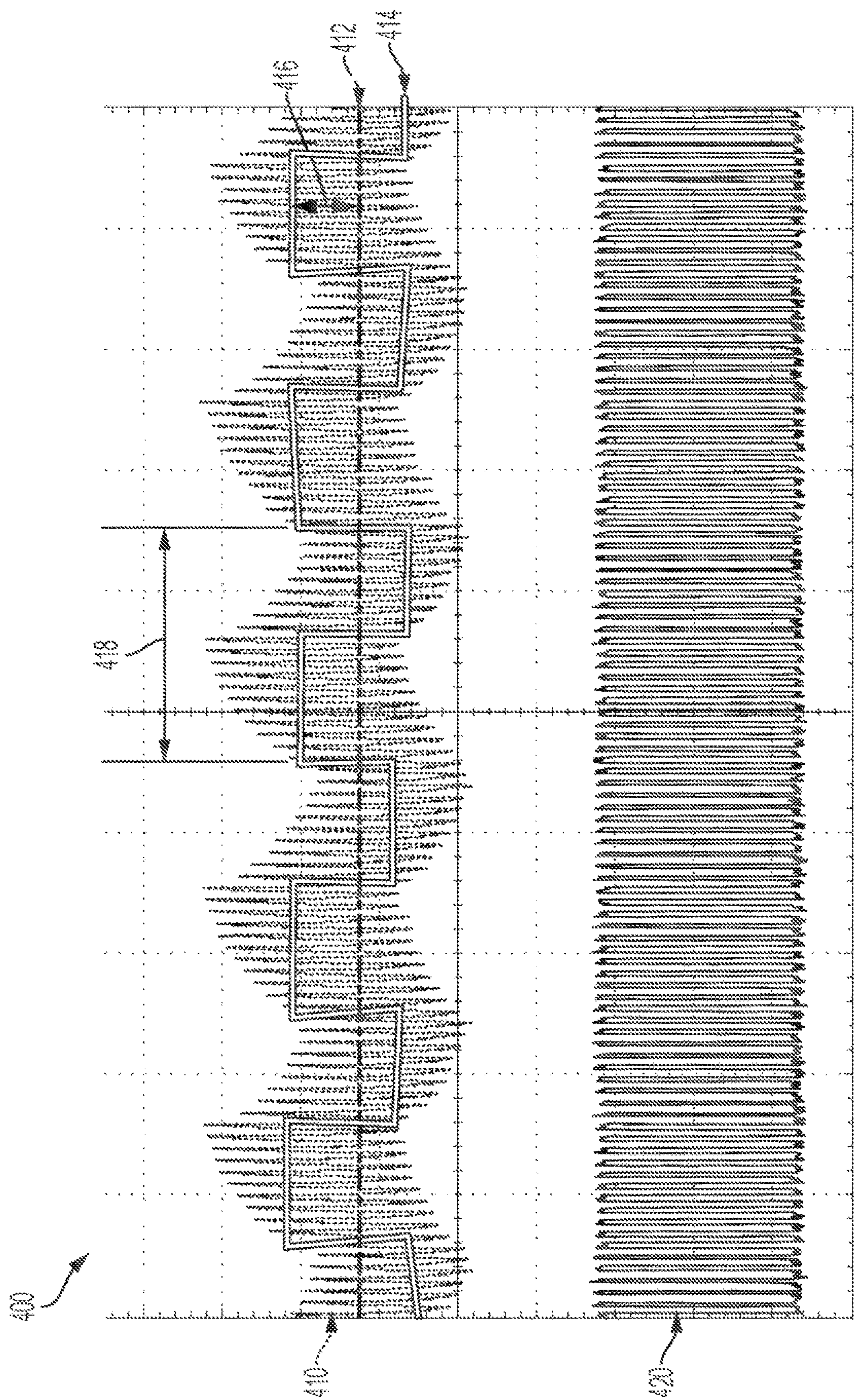
FIG. 4 is another exemplary graph illustrating an actual current flowing through the IMV and an actual voltage being applied across the IMV according to the present disclosure.

An exemplary graph 400 shown in FIG. 4 illustrates a target current without dither 412 (e.g., a high frequency PWM) which is also referred to as a raw current command without dither, a target current with dither 414 (e.g., a lower frequency dither square wave, shown by a white line with a black outline), an actual current 410 (shown by a dotted line) flowing through the IMV with dither, and an actual voltage 420 (shown by a solid line) being applied across the IMV. The target current with dither 414 has a dither amplitude 416 and a dither period 418, which may be adjusted. For example, the dither amplitude 416 may be adjusted by the engine controller 120 during an engine operation. It should be appreciated that the computing device 140 may transmit instructions to the engine controller 120 to adjust the dither amplitude 416 and a dither period 418. The use of a commanded dither waveform 414, which is added to the raw current command 412, allows for the amplitude of dither to be dynamically adjusted by the engine controller 120 during engine operation. The current 410 is shown in FIG. 4 as a sawtooth waveform. The voltage 420 is shown in FIG. 4 as a square waveform.

When a customer notices a reduction in performance of a vehicle (e.g., a loss of fuel pressure control performance), the vehicle may be brought into an automobile repair shop. A technician may perform an IMV service test to uniquely distinguish between the loss of fuel pressure control performance that occurs from a sticky IMV from other sources of poor pressure control (e.g., problems with the fuel pump, fuel supply plumbing, high pressure plumbing, and/or pressure sensors). To do so, the technician may use an application running on the computing device 140 to communicate with the engine controller 120 to run the IMV service test to determine the performance of the IMV's.

In operation, the computing device 140 may control and monitor performance of one or more IMVs via the engine controller 120. During the IMV service test, the engine controller 120 may apply varying amplitudes of dither (e.g., noise or vibration) in an IMV signal to determine a presence of sticky inlet metering valve (IMV). Additionally, the engine controller 120 may continually or periodically transmit feedback data to the computing device 140. In the illustrative embodiment, the application running on the computing device 140 may analyze the feedback data and detect a sticky IMV during the IMV service test. Additionally or alternatively, the technician may analyze the feedback data to detect a sticky IMV. In some embodiments, when the engine controller 120 detects a sticky IMV, the engine controller 120 may generate a specific diagnostic trouble code and transmit an alert to the computing device 140 and/or the technician. In some embodiments, the alert may be displayed on a display (e.g., a display 132) of the vehicle (e.g., an instrument panel of the vehicle).

The engine controller 120 may be embodied as an engine control module (ECM), an engine control unit (ECU), or a powertrain control module (PCM). The engine controller 120 includes a processor 122 (e.g., a central processing unit (CPU), a graphics processing unit (GPU)), a memory 124 (e.g., random-access memory (RAM), read-only memory (ROM), flash memory), an input/output (I/O) controller 126 (e.g., a network transceiver), a memory unit 128, and a database 130, all of which may be interconnected via one or more address/data bus. In some embodiments, the engine controller 120 may further include a display 132 and/or a user interface 134 (e.g., a touchscreen, a keyboard). It should be appreciated that although only one processor 122 is shown, the engine controller 120 may include multiple processors 122. Although the I/O controller 126 is shown as a single block, it should be appreciated that the I/O controller 126 may include a number of different types of I/O components.

The processor 122 as disclosed herein may be any electronic device that is capable of processing data, for example a central processing unit (CPU), a graphics processing unit (GPU), a system on a chip (SoC), or any other suitable type of processor. It should be appreciated that the various operations of example methods described herein (i.e., performed by the engine controller 120) may be performed by one or more processors 122. The memory 124 may be a random-access memory (RAM), read-only memory (ROM), a flash memory, or any other suitable type of memory that enables storage of data such as instruction codes that the processor 122 needs to access in order to implement any method as disclosed herein.

A database 130, which may be a single database or a collection of two or more databases, is coupled to the engine controller 120. In the illustrative embodiment, the database 130 is part of the engine controller 120. In some embodiments, the engine controller 120 may access the database 130 via a network such as the network 160. The engine controller 120 may also include various software applications stored in the memory unit 128 and executable by the processor 122. These software applications may include specific programs, routines, or scripts for performing functions associated with the methods described herein. Additionally, the software applications may include general-purpose software applications for data processing, database management, data analysis, network communication, web server operation, or other functions described herein or typically performed by a vehicle system controller.

Further, it should be appreciated that the computing device 140 may be embodied in any of a number of forms, such as a rack-mounted computer, a desktop computer, a laptop computer, or a tablet computer. Additionally, a computing device may be embedded in a device not generally regarded as a computing device but with suitable processing capabilities, including a Personal Digital Assistant (PDA), a smart phone or any other suitable portable or fixed electronic device.

The computing device 140 includes a processor 142 (e.g., a central processing unit (CPU), a graphics processing unit (GPU)), a memory 144 (e.g., random-access memory (RAM), read-only memory (ROM), flash memory), an input/output (I/O) controller 146 (e.g., a network transceiver), a memory unit 148, and a database 150, all of which may be interconnected via one or more address/data bus. It should be appreciated that although only one processor 142 is shown, the computing device 140 may include multiple processors 142. Although the I/O controller 146 is shown as a single block, it should be appreciated that the I/O controller 146 may include a number of different types of I/O components.

In some embodiments, the computing device 140 may further include a display 152 and/or a user interface 154 (e.g., a touchscreen, a keyboard). Additionally, the computing device 140 may have one or more input and output devices. These devices can be used, among other things, to present a user interface. Examples of output devices that can be used to provide the user interface 154 include printers or display screens for visual presentation of output and speakers or other sound generating devices for audible presentation of output. Examples of input devices that can be used for a user interface 154 include keyboards, and pointing devices, such as mice, touch pads, and digitizing tablets. As another example, a computing device may receive input information through speech recognition or in other audible format.

The processor 142 as disclosed herein may be any electronic device that is capable of processing data, for example a central processing unit (CPU), a graphics processing unit (GPU), a system on a chip (SoC), or any other suitable type of processor. It should be appreciated that the various operations of example methods described herein (i.e., performed by the computing device 140) may be performed by one or more processors 142. The memory 144 may be a random-access memory (RAM), read-only memory (ROM), a flash memory, or any other suitable type of memory that enables storage of data such as instruction codes that the processor 142 needs to access in order to implement any method as disclosed herein.

A database 150, which may be a single database or a collection of two or more databases, is coupled to the computing device 140. In the illustrative embodiment, the database 150 is part of the computing device 140. In some embodiments, the computing device 140 may access the database 150 via a network such as the network 160. The computing device 140 may also include various software applications stored in the memory unit 148 and executable by the processor 142. These software applications may include specific programs, routines, or scripts for performing functions associated with the methods described herein. For example, a software application may be executed to perform an inlet metering valve (IMV) service test. Additionally, the software applications may include general-purpose software applications for data processing, database management, data analysis, network communication, web server operation, or other functions described herein or typically performed by a computing device.

The computing device 140 is communicatively coupled to the engine controller 120 via one or more networks in any suitable form, including as a local area network, a controller area network, or a wide area network, such as an enterprise network or the Internet. Such networks may be based on any suitable technology and may operate according to any suitable protocol and may include wireless networks, wired networks or fiber optic networks. For example, the network 160 is any suitable type of computer network that functionally couples at least the computing device 140 with the engine controller 120. The network 160 may include a proprietary network, a secure public internet, a virtual private network and/or one or more other types of networks, such as dedicated access lines, plain ordinary telephone lines, satellite links, cellular data networks, or combinations thereof. In embodiments where the network 160 comprises the Internet, data communications may take place over the network 160 via an Internet communication protocol.

It should be understood that, in some embodiments, the engine controller 120 and/or the computing device 140 may form a portion of a processing subsystem including one or more computing devices having non-transient computer readable storage media, processors or processing circuits, and communication hardware. The engine controller 120 and/or the computing device 140 may be a single device or a distributed device, and the functions of the controller may be performed by hardware and/or by processing instructions stored on non-transient machine-readable storage media. Example processors include an application specific integrated circuit (ASIC), a field programmable gate array (FPGA), a digital signal processor (DSP), and a microprocessor including firmware. Example non-transient computer readable storage media includes random access memory (RAM), read only memory (ROM), flash memory, hard disk storage, electronically erasable and programmable ROM (EEPROM), electronically programmable ROM (EPROM), magnetic disk storage, and any other medium which can be used to carry or store processing instructions and data structures and which can be accessed by a general purpose or special purpose computer or other processing device.

Certain operations of engine controller 120 and/or the computing device 140 described herein include operations to interpret and/or to determine one or more parameters (e.g., test data). Interpreting or determining, as utilized herein, includes receiving values by any method known in the art, including at least receiving values from a datalink, network communication or input device, receiving an electronic signal (e.g. a voltage, frequency, current, or pulse-width-modulation signal) indicative of the value, such as the SOC of a vehicle, receiving a computer generated parameter indicative of the value, reading the value from a memory location on a non-transient machine readable storage medium, receiving the value as a run-time parameter by any means known in the art, and/or by receiving a value by which the interpreted parameter can be calculated, and/or by referencing a default value that is interpreted to be the parameter value.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the disclosed embodiments may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the disclosure discussed herein. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computing device or other processor to implement various aspects of the present disclosure as discussed above. Additionally, it should be appreciated that according to one aspect of the disclosure, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Figure 2:
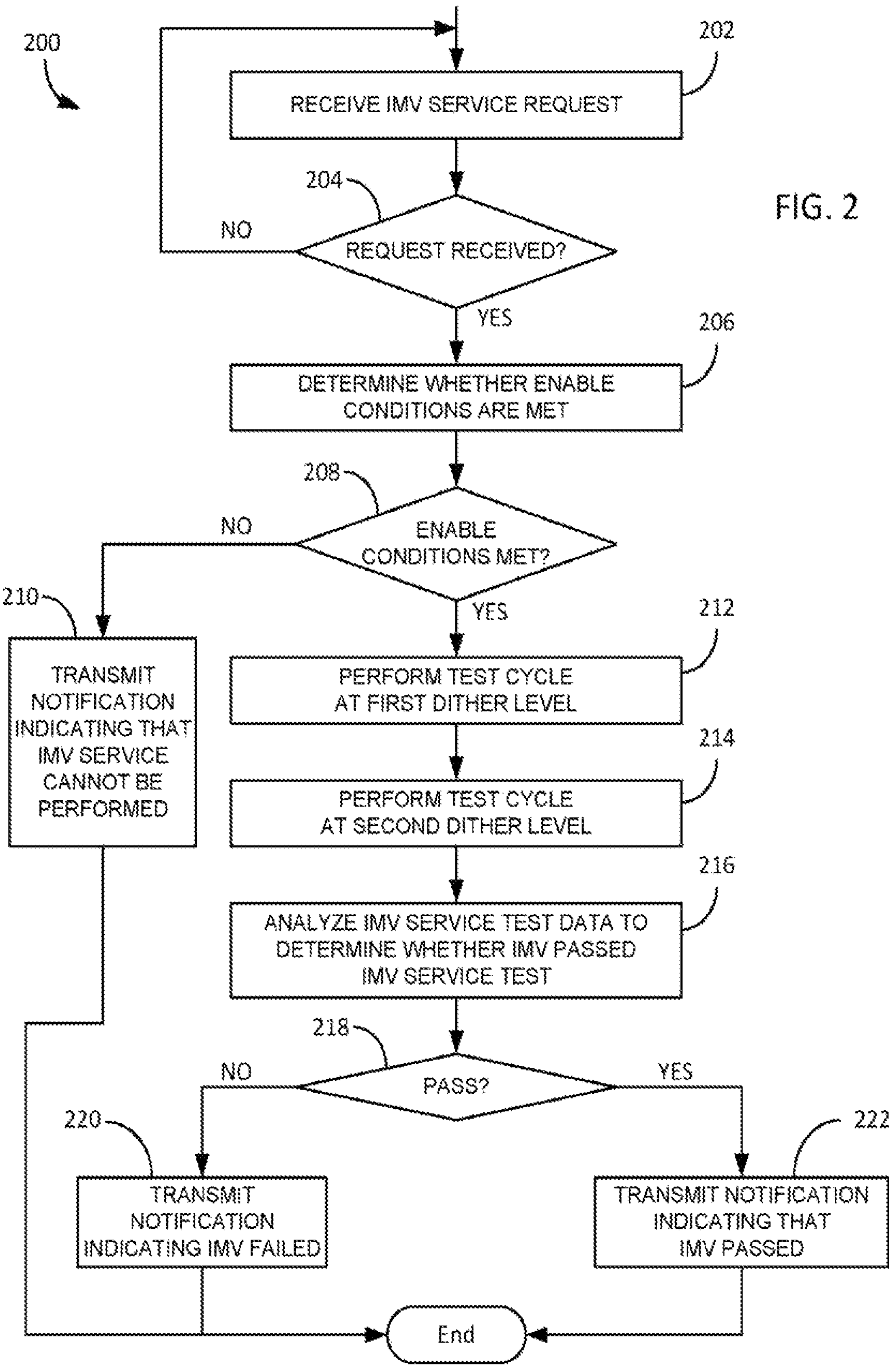
FIG. 2 is a flow chart depicting a method of detecting a high friction within a flow control device in fuel systems via a service test according to the present disclosure.

Referring now to FIG. 2, a computer-implemented method 200 for determining performance of inlet metering valves (IMVs) of a vehicle (e.g., the vehicle 110) is shown. In the illustrative embodiment, the method 200 is performed by a diagnostics monitoring system (e.g., the diagnostics monitoring system 100). For example, some of the method 200 is performed by the engine controller 120 and/or the computing device 140. As described above, the computing device 140 may control and monitor performance of one or more inlet metering valves (IMV's) via the engine controller 120. During an IMV service test, the computing device 140 transmits instructions to the engine controller 120 to dynamically adjust an amplitude of dither (e.g., noise or vibration) to determine a presence of a sticky inlet metering valve (IMV). In the illustrative embodiment, the computing device 140 transmits instructions to the engine controller 120 to adjust the amplitude of dither. In response, the engine controller 120 may continually or periodically transmit data back to the computing device 140. For example, the data may include an engine speed, a rail pressure feedback, and/or an absolute pressure error.

The method 200 begins at step 202 to receive an IMV service request to start an IMV service test to determine performance and/or condition of the one or more inlet metering valves (IMVs). For example, if a customer brings a vehicle into an automobile repair shop complaining a loss of fuel pressure control performance, a technician may perform an IMV service test using an application running on the computing device 140 to communicate with the engine controller 120.

If the diagnostics monitoring system 100 determines that the IMV service request has not been received in step 204, the method 200 loops back to step 202 to continue awaiting an IMV service request. If, however, the diagnostics monitoring system 100 determines that the IMV service test request is received in step 204, the method 200 proceeds to step 206.

At the step 206, the diagnostics monitoring system 100 determines whether one or more conditions to enable the IMV service test are met. For example, upon receiving the IMV service request, the computing device 140 transmits instructions to the engine controller 120 to start the IMV service test. In response, the engine controller 120 may determine whether one or more conditions to enable the IMV service test are met. As an example, the engine controller 120 may verify that the vehicle is not in motion, the engine speed is below a predetermined threshold, and/or there are no failure conditions such as a disconnected sensor that would prevent the execution of the IMV service test. If the one or more enable conditions are not met, the engine controller 120 may send a notification to the computing device 140 indicating that the IMV service test cannot be executed because the enabling conditions are not met. In some embodiments, the computing device 140 may further determine whether the one or more enabling conditions are met based on data received from the engine controller 120.

If the enable conditions are not met in step 204, the method 200 proceeds to step 210. At the step 210, the diagnostics monitoring system 100 transmits a notification to the technician indicating that the IMV service test is disabled and cannot be executed. For example, the notification may be displayed on a display of the computing device 140 and/or any computing device associated with the technician. In some embodiments, the notification may further include one or more reasons why the IMV service test could not be executed (e.g., one or more unsatisfied enabling conditions). In some embodiments, the notification may also include one or more remedial actions to be performed to satisfy the enable conditions.

Referring back to the step 208, if the enable conditions are met, the method 200 proceeds to step 212. At the step 212, the diagnostics monitoring system 100 transmits instructions (e.g., an IMV service test sequence) to the engine controller 120. The IMV service test sequence includes a series of pressure command changes which are executed at different amplitudes of dither. Specifically, in the illustrative embodiment, the IMV service test sequence includes a first test cycle at a first dither level and a second test cycle at a second dither level. The second dither level is different from the first dither level. In the illustrative embodiment, the second dither level is higher than the first dither level. However, it should be appreciated that, in some embodiments, the second dither level may be lower than the first dither level.

At the step 212, the engine controller 120 executes the IMV service test sequence to perform a first test cycle at a low dither amplitude to generate first test data.

At step 214, the engine controller 120 performs a second test cycle at a high dither amplitude to generate second test data. It should be appreciated that, in the illustrative embodiment, the first test cycle and the second test cycle are executed continuously, and the engine controller 120 dynamically adjusts the dither level between the test cycles of the IMV service test.

Additionally, the IMV service test sequence may consist of a series of segments. Each segment may begin with an excitement time where a pressure command is stepped up briefly and then back down to an original pressure level. The segment may end with a settling time for a rail pressure to stabilize back at a commanded pressure level. During the IMV service test, the engine controller 120 executes a predetermined number of segments at two predetermined dither levels. For example, as shown in exemplary IMV service test data illustrated in graphs 500 and 600 of FIGS. 5 and 6, respectively, 5 segments were used at a low dither amplitude and 5 segments were used a high dither amplitude. A variety of measurements are collected during the various segments. The maximum pressure overshoot and the minimum pressure undershoot during the excitement are recorded for each segment.

Figure 5:
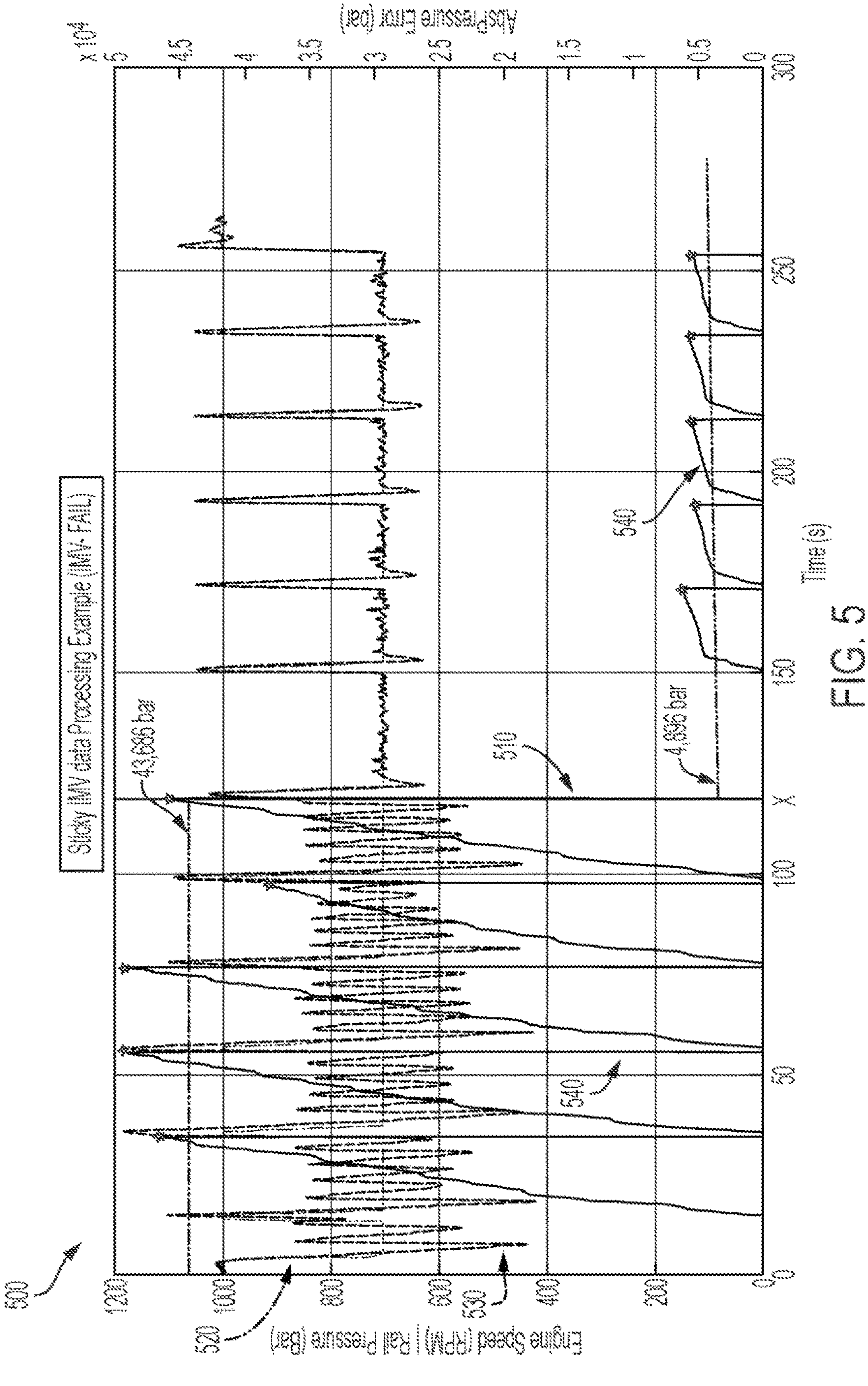
FIG. 5 is an exemplary graph illustrating service test data of a flow control device that failed the service test according to the present disclosure.

Specifically, exemplary IMV service test data of sticky IMV is illustrated in graph 500 in FIG. 5. The graph 500 illustrates a rail pressure command 520 (shown by the dash-dot-dot patterned line), a rail pressure feedback 530 (shown by the dashed line), and a sum of absolute pressure value error 540 (shown by the solid line, with a star marking each of its peaks) during the test segments at low dither amplitude (i.e., the left side of the line 510 at a time "X") and at high dither amplitude (i.e., the right side of the line 510). The rail pressure command 520 includes a plurality of "spikes" or an increase followed by a decrease, and a "plateau" region between two consecutive spikes, which repeats at a predetermined interval. The test segment is initiated at about 3 seconds and terminated at about 255 seconds to determine whether the IMV passes or fails. As can be seen in FIG. 5, the rail pressure feedback 530 fluctuates in amplitude at a greater degree on the left side of the line 510 than on the right side of the line 510, and there is a big difference between the rail pressure command 520 and the rail pressure feedback 530 at the low dither amplitude. When the dither amplitude is elevated, the rail pressure feedback 530 closely follows the rail pressure command 520. This indicates that the elevated dither caused the internal components of the IMV to reciprocate or vibrate, which replenished a lubricating fuel film between the moving components of the IMV. This in turn reduces the friction between the metal-to-metal contact within the IMV.

In the illustrative embodiment, the computing device 140 determines that the average absolute pressure error for the low dither amplitude is 43,686 bar and the average absolute pressure error for the higher dither amplitude is 4,896 bar. Subsequently, the computing device 140 determines whether a difference between the average absolute pressure errors for the low dither amplitude and the high dither amplitude exceeds a predetermined threshold. For example, the predetermined threshold is 30,000 bar. Since the difference exceeds the predetermined threshold, the computing device 140 determines that the behavior of the IMV changed significantly with the higher dither amplitude and, thus, conclude a presence of a sticky IMV.

Figure 6:
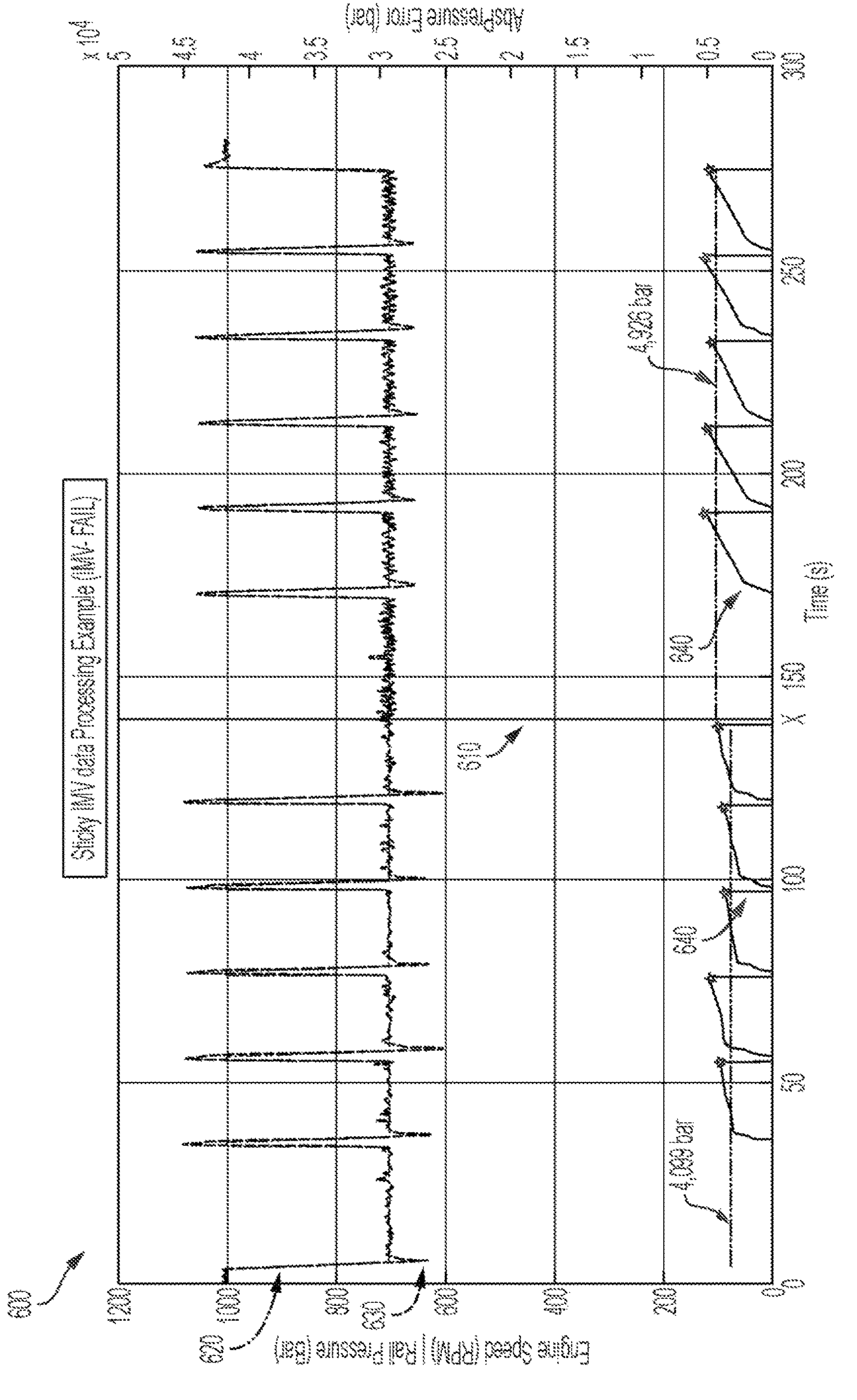
FIG. 6 is an exemplary graph illustrating service test data of a flow control device that passed the service test according to the present disclosure.

In contrast, exemplary IMV service test data of non-sticky IMV is illustrated in graph 600 in FIG. 6. The graph 600 illustrates a rail pressure command 620 (shown by the dash-dot-dot patterned line), a rail pressure feedback 630

(shown by the dashed line), and a sum of absolute pressure value error 640 (shown by the solid line, with a star marking each of its peaks) during a test segment at low dither amplitude (i.e., the left side of the line 610 at a time "X") and at elevated dither amplitude (i.e., the right side of the line 610). The test segment is initiated at about 3 seconds and terminated at about 270 seconds to determine whether the IMV passes or fails. As can be seen in FIG. 6, the rail pressure command 520 closely follows the rail pressure feedback 530 with low dither amplitude. The average absolute pressure error for the low dither amplitude is 4,099 bar. When the dither amplitude is elevated, the rail pressure feedback 530 still closely follows the rail pressure command 520. The average absolute pressure error for the higher dither amplitude her is 4,926 bar. The difference between the average absolute pressure errors for the low dither amplitude and the high dither amplitude is less than the predetermined threshold (e.g., 30,000 bar). Based on the difference, the computing device 140 determines that the IMV is not sticky.

It should be appreciated that the predetermined threshold may be universal throughout different types of engines. However, in some embodiments, the predetermined threshold may be predefined or predetermined based on a type or model of the engine. It should also be appreciated that the predetermined threshold may be stored in the engine controller 120. Additionally or alternatively, in some embodiments, the predetermined threshold may be determined by the computing device 140.

At step 216, upon receiving the IMV service test data (e.g., the first test data and the second test data), the computing device 140 analyzes the average IMV service test data to determine whether the vehicle has passed the IMV service test. For example, the engine controller 120 selects one of the available metrics from the IMV service test data and compares an average performance of the segments at each of the two dither levels. The engine controller 120 determines whether a magnitude or direction of the performance difference between the two dither levels exceeds a predetermined threshold to indicate a failure (i.e., sticky IMV). As described above, the IMV with high friction performs much better with an increased dither amplitude, whereas, normal IMV are not affected by the increased dither amplitude.

At step 218, if the diagnostics monitoring system 100 determines that the performance difference between the two dither levels exceeds a predetermined threshold, the method 200 proceeds to step 220. At the step 220, the diagnostics monitoring system 100 transmits a notification to a device associated with the technician indicating that the IMV failed the IMV service test. In other words, the change in the performance of the vehicle is at least in part due to the sticky IMV. In some embodiments, the notification may indicate to replace the high friction IMV. In some embodiments, the notification may also include one or more remedial actions to fix the high friction IMV by replenishing fluid within the IMV.

If, however, the diagnostics monitoring system 100 determines that the IMV passed the IMV service test in step 218, the method 200 proceeds to step 222. At the step 222, the diagnostics monitoring system 100 transmits a notification to a device associated with the technician indicating that the IMV passed the IMV service test. In other words, the change in the performance of the vehicle is unrelated to the mechanical stickiness in the IMV.

As described above, it should be appreciated that the present disclosure is applicable to any flow control device driven via PWM to detect a presence of high friction or mechanical stickiness within the flow control device.

This flowchart is merely an example, which should not unduly limit the scope of the claims. One of ordinary skill in the art would recognize many variations, alternatives, and modifications.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A diagnostic monitoring system for detecting a high friction within a flow control device of a fuel system, the diagnostic monitoring system comprising:

a computing device; and an engine controller communicatively coupled to the computing device and the flow control device, the engine controller and the computing device being configured to execute software to:

receive with the engine controller a service test sequence to execute a service test;

perform with the engine controller, in response to a receipt of the service test sequence, the service test to generate test data, the service test including a first test cycle with a first dither level and a second test cycle with a second dither level;

determine with the computing device whether a performance difference of the flow control device between the first test cycle and the second test cycle exceeds a predetermined threshold based on the test data; and detect with the computing device, in response to a determination that the performance difference exceeds the predetermined threshold, a presence of high friction within the flow control device, wherein the second dither level is different from the first dither level.

2. The diagnostic monitoring system of claim 1, wherein the engine controller is further configured to execute the software to cause the engine controller to:

determine, in response to a receipt of the service test sequence, whether one or more enable conditions are satisfied to execute the service test; and transmit, in response to a determination that the one or more enable conditions are not satisfied, a notification indicating that the service test cannot be executed, wherein the notification further includes one or more remedial actions that can be performed to satisfy the one or more enable conditions.

3. The diagnostic monitoring system of claim 1, wherein to perform the service test includes to control the flow control device using a high frequency pulse-width modulation (PWM) signal with a superimposed low frequency dither waveform.

4. The diagnostic monitoring system of claim 1, wherein to perform the service test includes to:

perform the first test cycle by applying a first amplitude of dither in a flow control device signal, and perform the second test cycle by apply a second amplitude of dither in the flow control device signal, the second amplitude is different from the first amplitude.

5. The diagnostic monitoring system of claim 1, wherein the test data includes:

a first rail pressure command and a first rail pressure feedback collected during the first test cycle, and a second rail pressure command and a second rail pressure feedback collected during the second test cycle.

6. The diagnostic monitoring system of claim 5, wherein to determine whether the performance difference between the first test cycle and the second test cycle exceeds the predetermined threshold includes to:

determine a first sum of absolute pressure error between the first rail pressure command and the first rail pressure feedback;

determine a second sum of absolute pressure error between the second rail pressure command and the second rail pressure feedback;

determine a difference between the first sum and the second sum;

determine whether the difference exceeds the predetermined threshold; and detect, in response to a determination that the difference exceeds the predetermined threshold, the presence of high friction within the flow control device.

7. The diagnostic monitoring system of claim 6, wherein the engine controller is configured to execute the software to further cause the computing device to:

transmit, in response to a detection of the presence of high friction within the flow control device, a notification to a technician to replace the flow control device.

8. A method for detecting a high friction within a flow control device of a fuel system, the method comprising:

communicatively coupling a computing device and an engine controller; and operating the engine controller and the computing device to:

receive with the engine controller from the computing device a service test sequence to execute a service test;

perform with the engine controller, in response to receiving the service test sequence, the service test by controlling the flow control device to generate test data, the controlling including a first test cycle with a first dither level and a second test cycle with a second dither level;

determine with the computing device whether a performance difference of the flow control device between the first test cycle and the second test cycle exceeds a predetermined threshold based on the test data; and detect with the computing device, in response to determining that the performance difference exceeds the predetermined threshold, a presence of high friction within the flow control device;

output form the computing device a technician-perceptible notification of the presence of high friction within the flow control device, wherein the second dither level is different from the first dither level.

9. The method of claim 8, wherein the engine controller is further configured to:

determine, in response to receiving the service test sequence, whether one or more enable conditions are satisfied to execute the service test; and transmit, in response to determining that the one or more enable conditions are not satisfied, a notification indicating that the service test cannot be executed, wherein the notification further includes one or more remedial actions that can be performed to satisfy the one or more enable conditions.

10. The method of claim 8, wherein performing the service test includes controlling the flow control device using a high frequency pulse-width modulation (PWM) signal with a superimposed low frequency dither waveform.

11. The method of claim 10, wherein performing the service test includes:

performing the first test cycle by applying a first amplitude of dither in a flow control device signal, and performing the second test cycle by apply a second amplitude of dither in the flow control device signal, the second amplitude is different from the first amplitude.

12. The method of claim 8, wherein the test data includes:

a first rail pressure command and a first rail pressure feedback collected during the first test cycle, and a second rail pressure command and a second rail pressure feedback collected during the second test cycle.

13. The method of claim 12, wherein determining whether the performance difference between the first test cycle and the second test cycle exceeds the predetermined threshold includes:

determining a first sum of absolute pressure error between the first rail pressure command and the first rail pressure feedback;

determining a second sum of absolute pressure error between the second rail pressure command and the second rail pressure feedback;

determining a difference between the first sum and the second sum;

determining whether the difference exceeds the predetermined threshold; and detecting, in response to determining that the difference exceeds the predetermined threshold, the presence of high friction within the flow control device.

14. The method of claim 13, further comprising:

transmitting, in response to detecting the presence of high friction within the flow control device, a notification to a technician to replace the flow control device.

15. A non-transitory computer-readable medium storing instructions for detecting a high friction within a flow control device of a fuel system, the instructions when executed by one or more processors of a computing device, cause the computing device to:

receive a service test sequence to execute a service test;

perform, in response to a receipt of the service test sequence, the service test to generate test data, the service test including a first test cycle with a first dither level and a second test cycle with a second dither level;

determine whether a performance difference of the flow control device between the first test cycle and the second test cycle exceeds a predetermined threshold based on the test data; and detect, in response to a determination that the performance difference exceeds the predetermined threshold, a presence of high friction within the flow control device, wherein the second dither level is different from the first dither level.

16. The non-transitory computer-readable medium of claim 15, wherein the instructions when executed by the one or more processors further cause the computing device to:

determine, in response to a receipt of the service test sequence, whether one or more enable conditions are satisfied to execute the service test; and transmit, in response to a determination that the one or more enable conditions are not satisfied, a notification indicating that the service test cannot be executed, wherein the notification further includes one or more remedial actions that can be performed to satisfy the one or more enable conditions.

17. The non-transitory computer-readable medium of claim 15, wherein to perform the service test includes to control the flow control device using a high frequency pulse-width modulation (PWM) signal with a superimposed low frequency dither waveform.

18. The non-transitory computer-readable medium of claim 15, wherein to perform the service test includes to:

perform the first test cycle by applying a first amplitude of dither in a flow control device signal, and perform the second test cycle by apply a second amplitude of dither in the flow control device signal, the second amplitude is different from the first amplitude.

19. The non-transitory computer-readable medium of claim 15, wherein the test data includes:

a first rail pressure command and a first rail pressure feedback collected during the first test cycle, and a second rail pressure command and a second rail pressure feedback collected during the second test cycle.

20. The non-transitory computer-readable medium of claim 19, wherein to determine whether the performance difference between the first test cycle and the second test cycle exceeds the predetermined threshold includes to:

determine a first sum of absolute pressure error between the first rail pressure command and the first rail pressure feedback;

determine a second sum of absolute pressure error between the second rail pressure command and the second rail pressure feedback;

determine a difference between the first sum and the second sum;

determining whether the difference exceeds the predetermined threshold; and detect, in response to a determination that the difference exceeds the predetermined threshold, the presence of high friction within the flow control device.

* * * * *